US008076626B2

(12) United States Patent
Ohide et al.

(10) Patent No.: US 8,076,626 B2
(45) Date of Patent: Dec. 13, 2011

(54) LIGHT AMOUNT CONTROL, OPTICAL WRITING, AND IMAGE FORMING APPARATUSES HAVING A PLURALITY OF DRIVE-CURRENT SETTING UNITS

(75) Inventors: Toshio Ohide, Kanagawa (JP); Kenichi Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 630 days.

(21) Appl. No.: 12/039,955

(22) Filed: Feb. 29, 2008

(65) Prior Publication Data

US 2008/0218723 A1 Sep. 11, 2008

(30) Foreign Application Priority Data

Mar. 5, 2007 (JP) ................................ 2007-054312

(51) Int. Cl.
*G01J 1/32* (2006.01)

(52) U.S. Cl. .................................... 250/205; 250/214 R

(58) Field of Classification Search .................. 250/205, 250/214 R, 214.1, 208.1; 315/291, 224; 358/480, 481; 355/35, 37; 347/238–247
See application file for complete search history.

(56) References Cited

U.S. PATENT DOCUMENTS

| | | | | |
|---|---|---|---|---|
| 4,700,057 | A * | 10/1987 | Sakai | 250/205 |
| 5,965,868 | A | 10/1999 | Nakamori | |
| 6,885,159 | B2 * | 4/2005 | Watanabe | 315/291 |
| 2004/0145546 | A1 | 7/2004 | Hyuga | |

FOREIGN PATENT DOCUMENTS

| | | |
|---|---|---|
| EP | 0 258 060 | 3/1988 |
| EP | 1 528 501 | 5/2005 |
| JP | 62 124576 | 6/1987 |
| JP | 02 151455 | 6/1990 |
| JP | 09-277591 | 10/1997 |
| JP | 10-109440 | 4/1998 |
| JP | 2001-138566 | 5/2001 |
| JP | 2003-266774 | 9/2003 |

OTHER PUBLICATIONS

European Search Report (5 pages).

* cited by examiner

*Primary Examiner* — Que T Le
(74) *Attorney, Agent, or Firm* — Dickstein Shapiro LLP

(57) ABSTRACT

A light-amount control apparatus for controlling an output light amount of light sources used for optical writing is disclosed. The apparatus includes one or more drive units for supplying a drive current to the light source; one or more drive-current setting units for determining an amount of the drive current provided to the light source from the drive unit; a light-amount detecting unit for detecting an output light from the light source; and outputting a voltage according to the detected light amount; and a processing unit for setting the drive current amount based on the detected value detected with the light-amount detecting unit.

11 Claims, 10 Drawing Sheets

LIGHT AMOUNT CONTROL, OPTICAL WRITING, AND IMAGE FORMING APPARATUSES HAVING A PLURALITY OF DRIVE-CURRENT SETTING UNITS

TECHNICAL FIELD

The present invention relates to a light amount control apparatus for a light source used in optical writing, an optical writing apparatus with the light amount control apparatus, and an image forming apparatus with the optical writing apparatus.

BACKGROUND ART

A laser diode is generally used as a writing light source for a printing device such as a printer or copier. The laser diode used as an optical writing light source requires that a light emission amount be kept to a constant value for making the density of a generated image constant. Thus, JP2001-138566A, for example, discloses, for keeping a light amount of a laser diode (LD) constant, detecting at a photodetecting device (PD) housed in the same package as the LD light from the LD, and using a monitoring current generated at the detecting PD to control the light amount to be constant. In other words, the monitoring current generated at the PD due to the detected light passes through a light-amount setting variable resistor so as to be converted to a monitoring voltage, which is input to a comparator so as to be compared with a reference voltage and controls the voltage of a hold capacitor. Specifically, with the comparator output connected to a control circuit, the process is performed such that, with a sample-and-hold signal input to a control circuit in the sample mode, the monitoring and reference voltages are compared so that when "the monitoring voltage>the reference voltage", a current passes through the hold capacitor from a constant discharging current source so as to cause a voltage drop across the hold capacitor; when "the monitoring voltage<the reference voltage", a current passes through the hold capacitor from a constant charging current source so as to cause a voltage rise across the hold capacitor. With the sample-and-hold signal input to the control circuit in the hold mode, the constant current source is disconnected from the hold capacitor. In this way, the terminal voltage of the hold capacitor is input to a differential amplifier, causing a current supplied to the LD to be increased or decreased according to the difference with the reference voltage. Such a series of control loops as described above allows the light emission amount of the LD to be kept constant.

Recently, a light-emitting device has also been developed which has a large number of light-emitting points in one package, and is used as a writing light source for a printing device. For example, JP2003-266774A discloses an image-forming apparatus using a VCSEL with 32 light-emitting points.

However, with the control method as disclosed in JP2001-138566, where a hold capacitor is charged or discharged during a sample period, and placed in a hold mode at other times so as to keep the light amount constant, there may be a problem of a light amount decrease caused by a decrease in a terminal voltage due to a leakage current of the hold capacitor. Moreover, the sample period needs to be placed at a time other than an image writing period. With an arrangement using a light source with a large number of light-emitting points, as disclosed in JP2003-266774A, a light-amount control of all the light-emitting points cannot be performed within one scan period. Therefore, there is a further problem of a light amount decrease caused by a decrease in the terminal voltage of the hold capacitor.

Now, a problem to be solved by the present invention is to ensure control sufficient to keep the light amount constant, and to ensure control sufficient to keep the light amount constant even with, especially, a light source with a large number of light-emitting points.

DISCLOSURE OF THE INVENTION

Accordingly, it is a general object of the present invention to provide techniques for light amount control for a light source used in optical writing, for optical writing with the light amount control, and for image forming with the optical writing apparatus that substantially obviate one or more problems caused by the limitations and disadvantages of the related art.

According to the invention, a light-amount control apparatus for controlling an output light amount of light sources used for optical writing includes one or more drive units for supplying a drive current to the light source; one or more drive-current setting units for determining an amount of the drive current provided to the light source from the drive unit; a light-amount detecting unit for detecting an output light from the light source, and outputting a voltage according to the detected light amount; and a processing unit for setting the drive current amount based on the detected value detected with the light-amount detecting unit.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

Descriptions are given next, with reference to the accompanying drawings, of embodiments of the present invention.

The present invention is not limited to the specifically disclosed embodiments, but variations and modifications may be made without departing from the scope of the present invention.

Embodiments according to the present invention are described, referring to FIG. 1 through FIG. 10.

Embodiment 1

Figure 1:
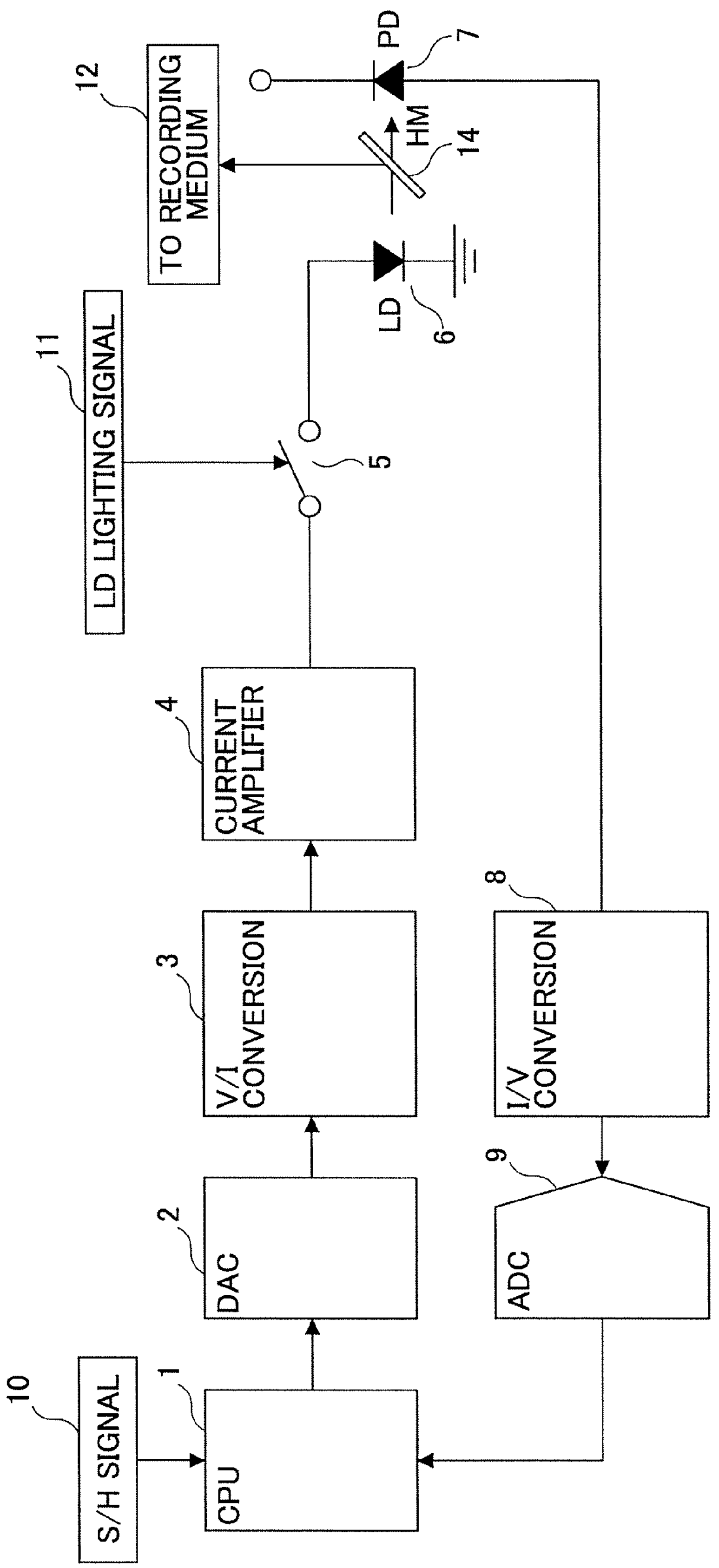
FIG. 1 is a block diagram illustrating a circuit configuration of a light amount control apparatus according to a first embodiment of the invention.

FIG. 1 is a block diagram illustrating a circuit configuration of a light amount control apparatus according to a first embodiment of the invention. As shown, the light amount control apparatus basically includes a CPU 1, a DAC (digital/analog converter) 2, a V/I (voltage/current) converter 3, a current amplifier 4, a switching element 5, a LD (laser diode) 6, a PD (photodiode) 7, an I/V (current/voltage) converter 8, and an ADC (analog/digital converter) 9.

In a light amount control apparatus having the constituting elements as described above, the CPU 1 sets a DAC code corresponding to a LD drive current in the DAC 2 based on a sample-and-hold signal 10 input from a sample-and-hold circuit (not shown). The DAC 2 outputs a voltage according to the set DAC code. The voltage output from the DAC 2 is converted at the V/I converter 3 to a current, which is input to the current amplifier 4. With a LD lighting signal 11 on, a current output from the current amplifier 4 is supplied to the LD 6, which turns on at a light amount according to the current.

A light output from the LD 6 is divided with a half mirror 14 into two beams, one of which is input to the PD 7 as a photodetector. The other is directed to a recording medium 12 of the image forming apparatus body. The beam input to the PD 7 is converted to a current, which, at the I/V converter 8, is converted to a voltage, which is input to the ADC 9. The converted digital output of the ADC 9 is input to the CPU 1. The CPU 1 compares the converted digital value input from the ADC 9 with a predetermined target digital value, and computes a new DAC code such that the converted digital input and the target digital value match. Thereafter, the CPU 1 sets a new DAC code in the DAC 2.

Executing such a series of control loops as described above allows keeping an output light amount of the LD 6 at the predetermined target value.

Figure 2:
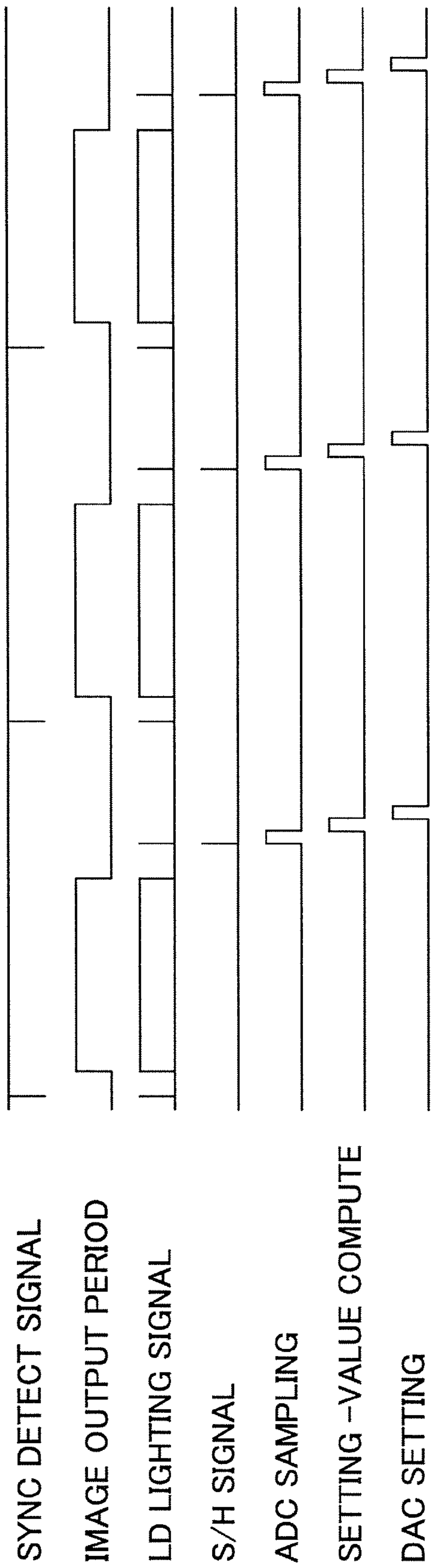
FIG. 2 is a timing chart illustrating timings of controlling the light amount while outputting an image, according to the first embodiment of the invention.

FIG. 2 is a timing chart illustrating timings of controlling the light amount while outputting an image. The timing chart shows output timings of a sync detect signal, an image output period, a LD lighting signal, a sample-and-hold (S/H) signal, an ADC sampling signal, a setting-value compute signal, and a DAC setting signal. The sync detect signal, which is for setting a write-start timing when starting optical writing, and for synchronizing the subsequent timing, is obtained by detecting a scanned light with a sync detect sensor. A predetermined time after the sync detect signal is turned on, an image output period starts and the LD 6 turns on. Moreover, inputting a sample-and-hold signal 10 leads to an ADC sampling signal output, according to which the setting value of the DAC 2 is computed and the DAC code set.

Figure 3:
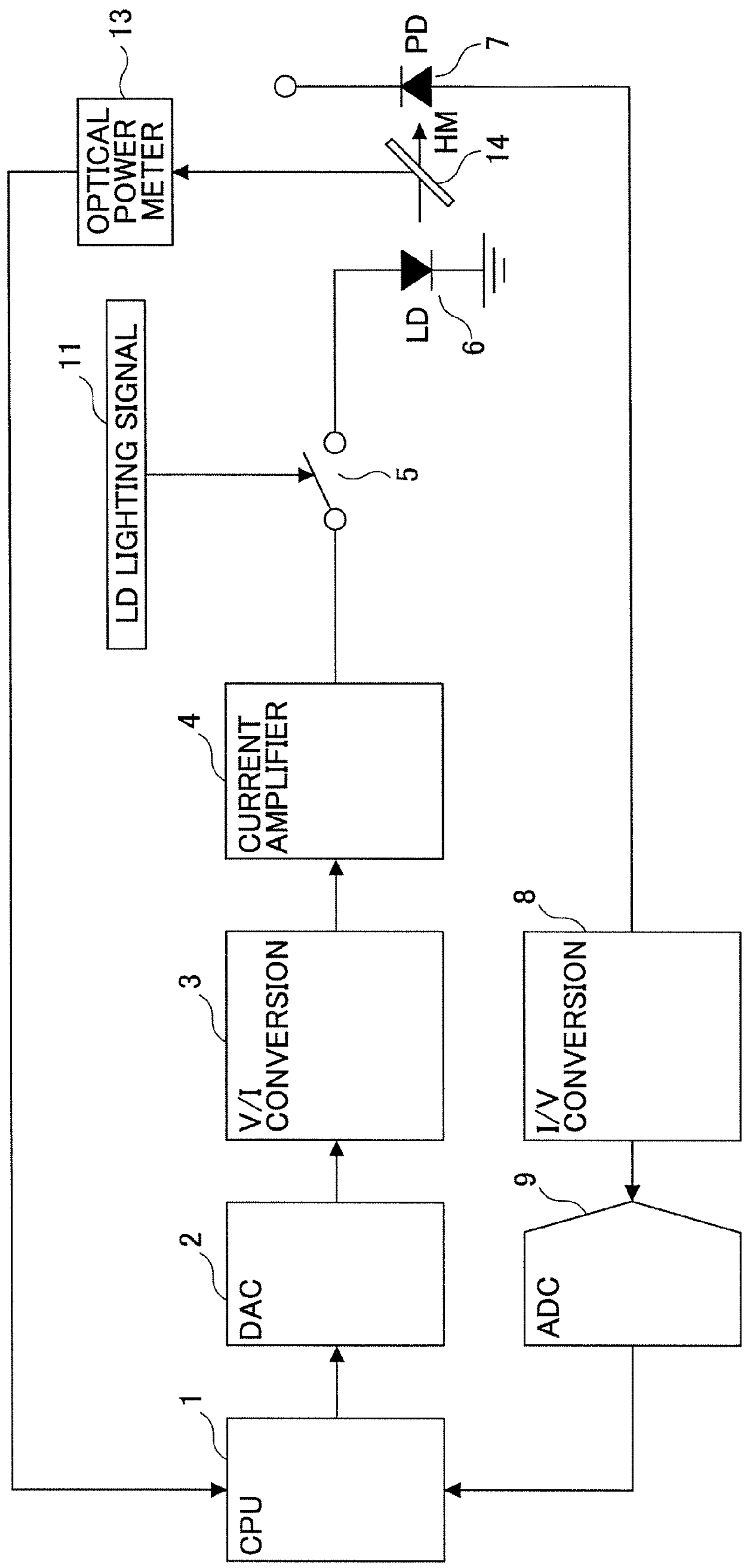
FIG. 3 is a block diagram illustrating a circuit configuration for determining a target digital value according to the first embodiment.

FIG. 3 is a block diagram illustrating a circuit configuration for determining a target digital value. The control process here requires determining in advance the target digital value in order to keep the light amount of the LD 6 at a target value. Now, as illustrated in FIG. 3, in order to determine a target digital value with the light amount of the LD 6 being the target value, within a light path to the recording medium 12 is inserted an optical power meter 13 for measuring a physical amount of the LD light amount, an output of which meter is input to the CPU 1. Here, measuring a physical amount means obtaining an absolute value of a light amount.

Figure 4:
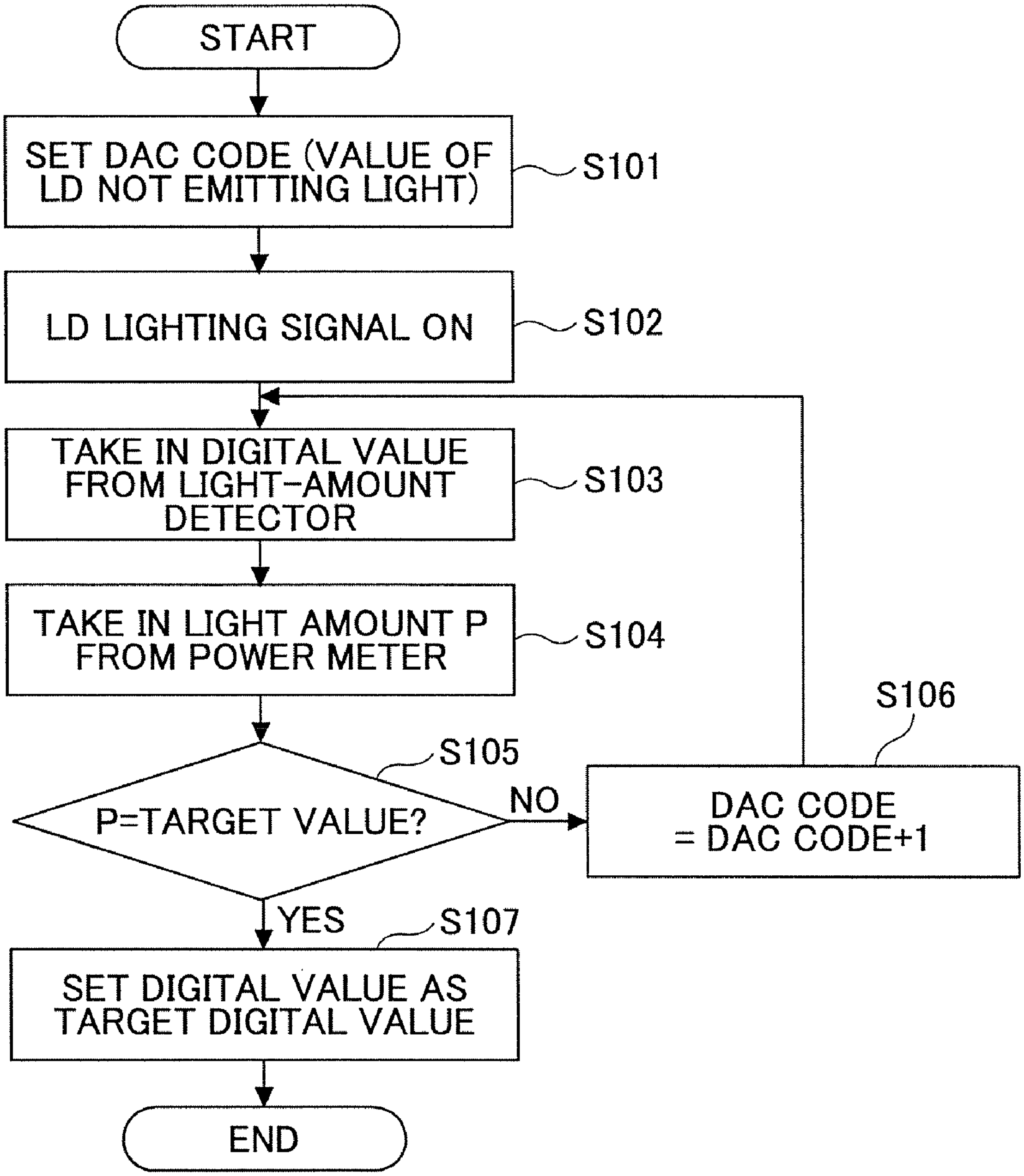
FIG. 4 is a flowchart illustrating a control procedure for determining a target digital value with the circuit configuration in FIG. 3.

FIG. 4 is a flowchart illustrating a control procedure for determining a target digital value with the circuit configuration in FIG. 3. With the control procedure, the CPU 1 sets a DAC code to a value corresponding to the LD 6 not emitting light (Step S101) with the LD lighting signal turned on (Step S102). Then, a digital value is taken in from the PD 7 based on a light-emitting amount of the LD 6 (Step S103), and an optical amount P is taken in from the power meter 13 (Step S104). Then, the procedure of Steps S103 to S105 is repeated, incrementing by 1 the DAC code until P becomes the target value (Steps 105, 106). When the light amount P becomes the target value, the digital value based on the DAC code at that time becomes the target digital value (Step 107). The control procedure as described above, which is programmed, is executed at the CPU 1.

In this way, the CPU 1 keeps the target digital value determined in Step S107, and thereafter uses the target digital value to keep the light amount of the LD 6 at a constant value.

Controlling in this way allows doing away with a hold capacitor as the setting value of the LD drive current is set in the DAC 2.

Figure 5:
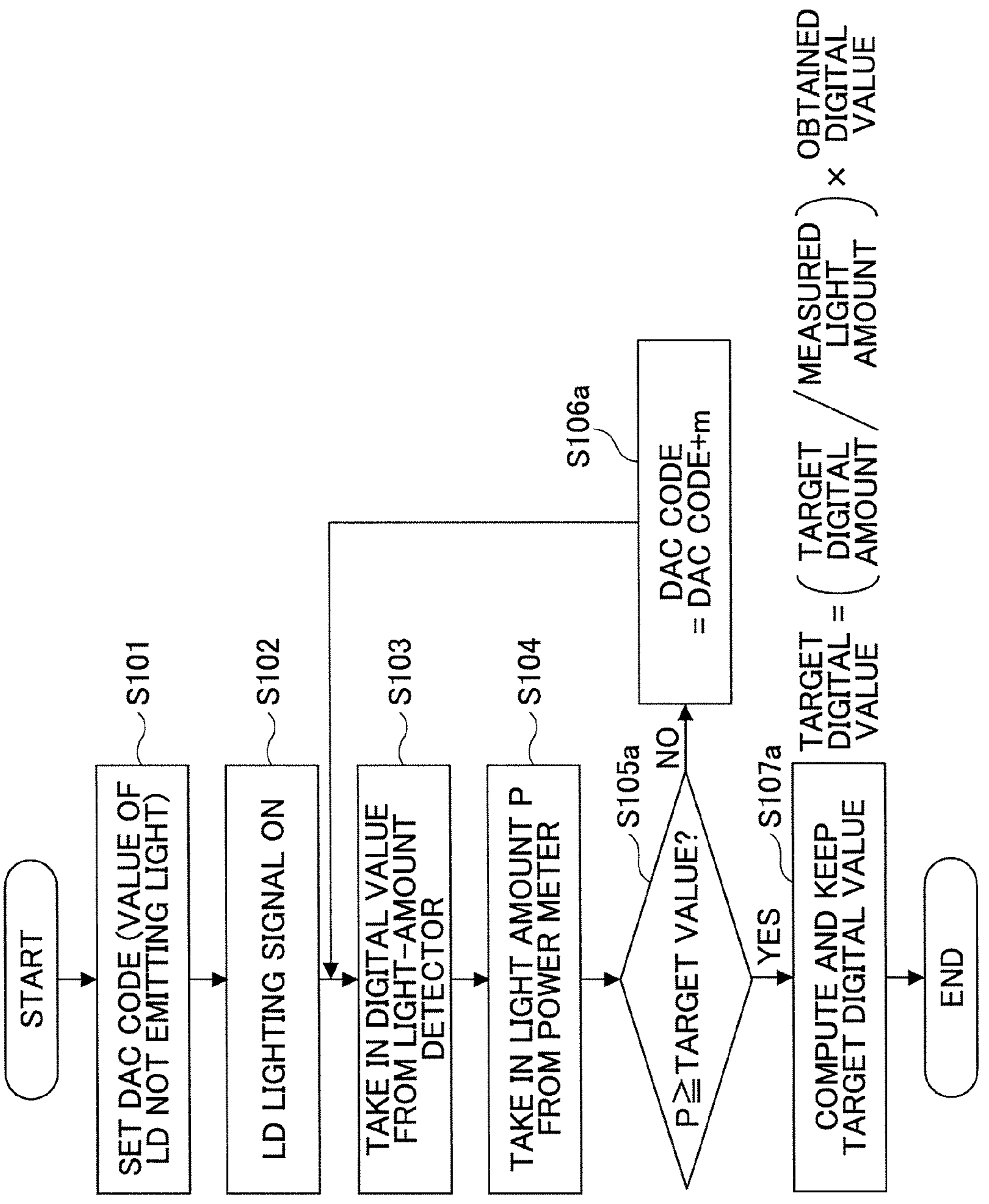
FIG. 5 is a flowchart illustrating another control procedure for determining the target digital value with the circuit configuration in FIG. 3.

FIG. 5 is a flowchart illustrating another control procedure for determining the target digital value with the circuit configuration in FIG. 3. With this control procedure, the decision as to whether the light amount P in Step S105 is the target value is changed to a decision as to whether it is greater than the target value, and the process of making the increment of the DAC code of step S106 to be 1 is changed to the process of making the increment of the DAC code of step S106 to be m. Moreover, with the changes as described above, the process of computing the target digital value in Step S107 is changed to the process in step S107 of:

target digital value=(target light amount/measured light amount)×obtained digital value.

In other words, with the control procedure in FIG. 5, with the light amount not reaching the target (Step S105*a*—No), the DAC code is incremented by a step m which is larger than the minimum resolution of the DAC. Then, when the light amount reaches an amount not less than the target, the target digital value is calculated from the digital value from the PD 7, the light amount, and the target light amount as shown in equation (1) (Step S107*a*). In this way, a target digital value can be accurately determined even if the light amount does not match the target. Moreover, increasing the DAC code in an increment larger than a minimum resolution of the DAC makes it possible to reduce the time required for the control process. Each of the other steps is processed in a similar manner to that of FIG. 3.

The control procedure as described above, which is programmed, is executed at the CPU 1.

Embodiment 2

Figure 6:
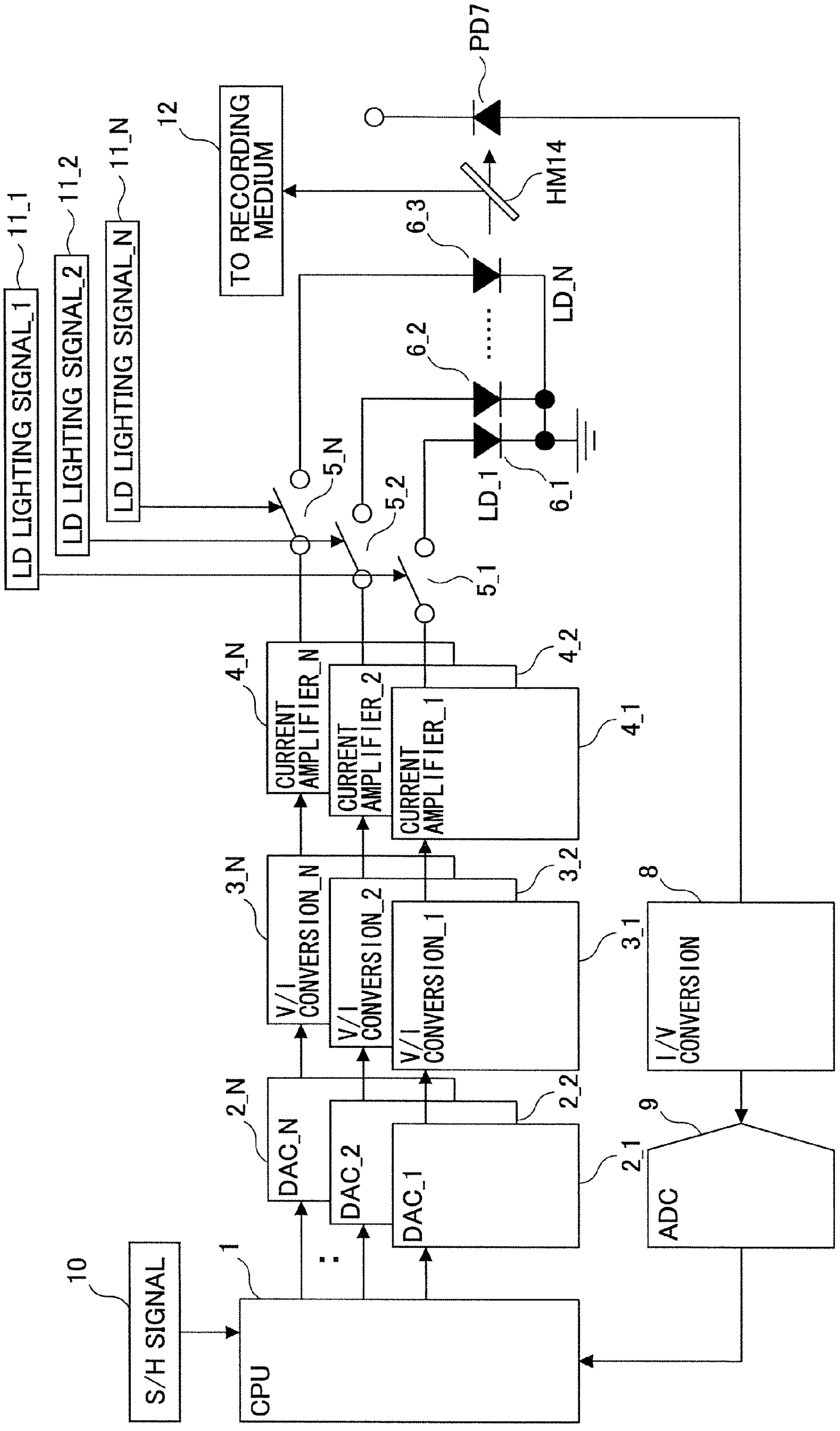
FIG. 6 is a block diagram illustrating a circuit configuration of a light amount control apparatus according to a second embodiment of the invention.

FIG. 6 is a block diagram illustrating a circuit configuration of a light amount control apparatus according to a second embodiment of the invention. While the first embodiment is directed to an arrangement with a single light-emitting point (light-emitting source), the second embodiment here is directed to an arrangement with N light-emitting points (where N is a positive integer no less than 2).

Thus, in this embodiment, compared to the light amount control apparatus in the first embodiment, N DACs 2, N V/I converters 3, N current amplifiers 4, N switching elements 5, and N LDs 6 are provided. As shown, the respective elements 1 to N are marked _1, _2, . . . , _N.

In the light amount control apparatus thus arranged, the CPU 1 sets a DAC code 1 corresponding to a LD drive current in a DAC_1 (2_1). The DAC_1 (2_1) outputs a voltage according to the set DAC code 1. The voltage output from the DAC_1 (2_1) is converted at the V/I converter_1 (3_1) to a current, which is input to the current amplifier_1 (4_1). When the LD lighting signal_1 (11_1) is on, the output current from the current amplifier_1 (4_1) is supplied to LD_1 (6_1), which turns on at a light amount according to the current.

The light output from the LD_1 (6_1) is divided with a half mirror 14 into two beams, one of which is input to the PD (photodetector) 7, while the other is directed to the recording medium 12. The beam input to the PD 7 is converted to a current, which, at the I/V converter 8 is converted to a voltage, which is input to the ADC 9. The converted digital output of the ADC 9 is input to the CPU 1.

The CPU 1 compares the converted digital input from the ADC 9 with the predetermined target digital value_1, and computes a new DAC code_1 such that the converted digital input and the target digital value_1 match. Thereafter, the CPU 1 sets the new DAC code_1 in the DAC 2.

The control process as described above is sequentially performed for LD_2 . . . N, which repeating allows keeping the respective LD 6 output light amounts at a predetermined target value.

Figure 7:
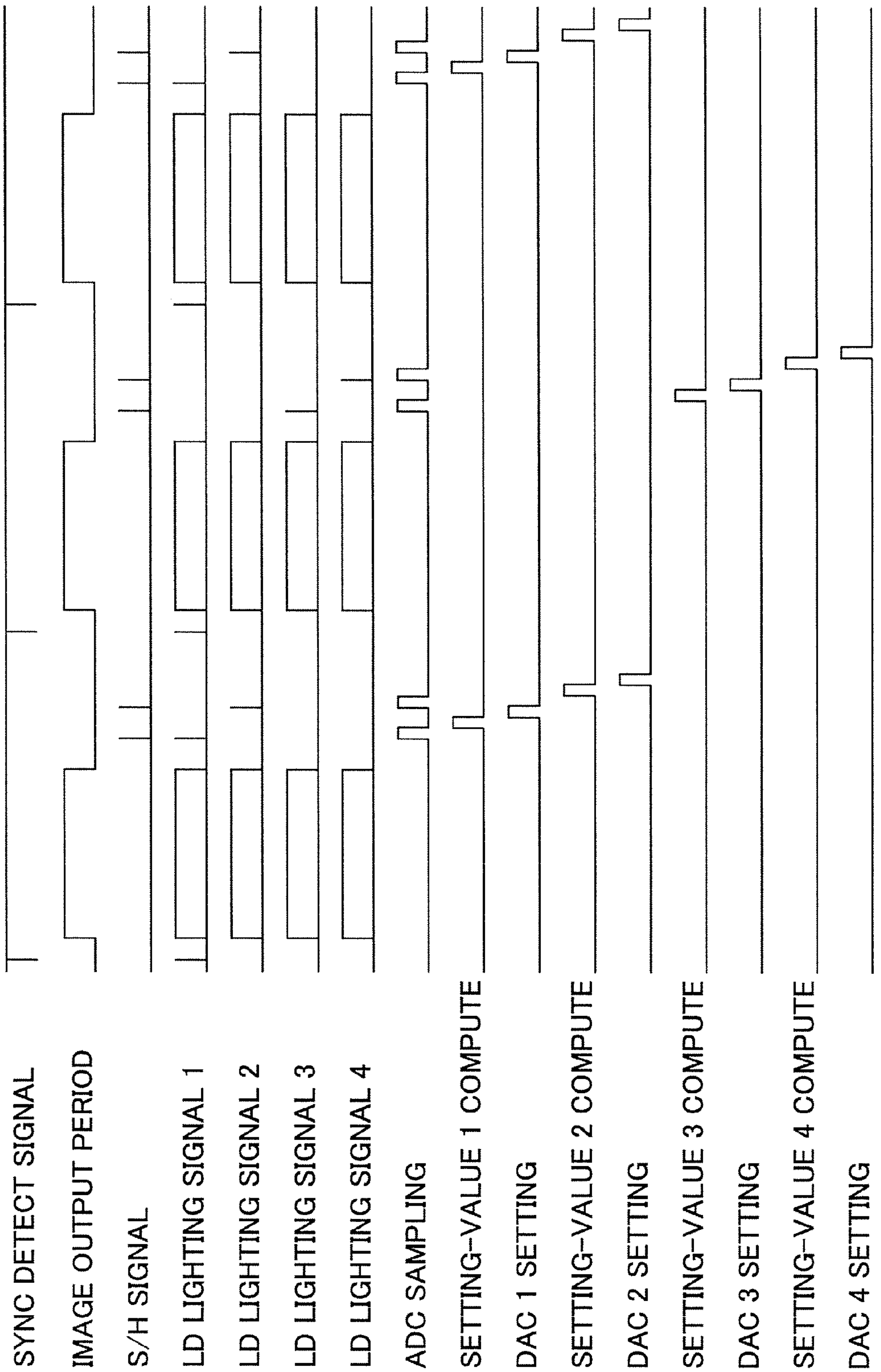
FIG. 7 is a timing chart illustrating timings of controlling the light amount while outputting an image, according to the second embodiment of the invention.

FIG. 7 is a timing chart illustrating timings of controlling the light amount while outputting an image. In this example, for N=4, light amounts of two LDs are controlled within one scan period.

The illustrated timing chart shows output timings of a sync detect signal, an image output period, a sample-and-hold (S/H) signal, LD lighting signals 1 through 4, an ADC sampling signal, setting-value compute signals 1 through 4, and DAC setting signals 1 through 4. The sync detect signal, which is for setting a write-start timing when starting optical writing and for synchronizing the subsequent timing, is obtained by detecting a scanned light with a sync detect sensor. A predetermined time after the sync detect signal is turned on, an image output period starts and the LD_1 to 4 (6_1 to 4) turns on. Moreover, inputting a sample-and-hold signal 10 leads to an ADC sampling signal output, according to which the setting value of the DAC_1 to 4 (2_1 to 4) is computed and the respective DAC_1 to 4 (2_1 to 4) codes are set.

Figure 8:
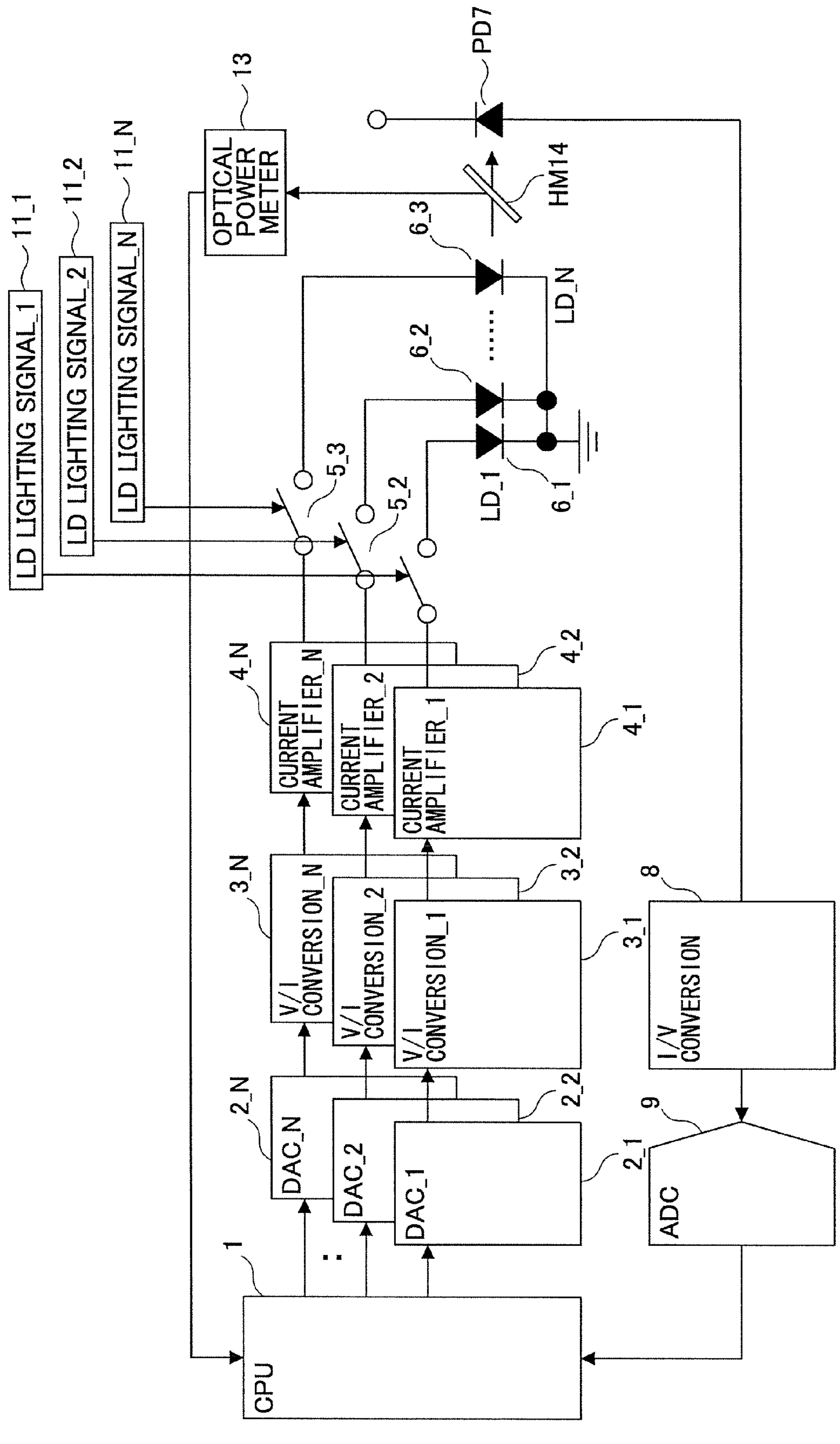
FIG. 8 is a block diagram illustrating a circuit configuration for determining a target digital value according to the second embodiment.

Again the control process here requires individually determining in advance the target digital value in order to keep the light amount of the respective LD_1 to 4 (6_1 to 4) at a target value. Now in this embodiment, as in the first embodiment, in order to determine a target digital value with the light amount of the respective LDs being the target value, within a light path to the recording medium is inserted an optical power meter 13 for measuring a physical amount of the LD light amount, an output of which meter is input to the CPU 1. FIG. 8 is a block diagram illustrating a circuit configuration for determining a target digital value according to the second embodiment. FIG. 8 shows the arrangement in FIG. 6 additionally provided with just an optical power meter 13. Thus, the identical elements are assigned the identical reference letters, so that duplicating explanations are omitted.

Figure 9:
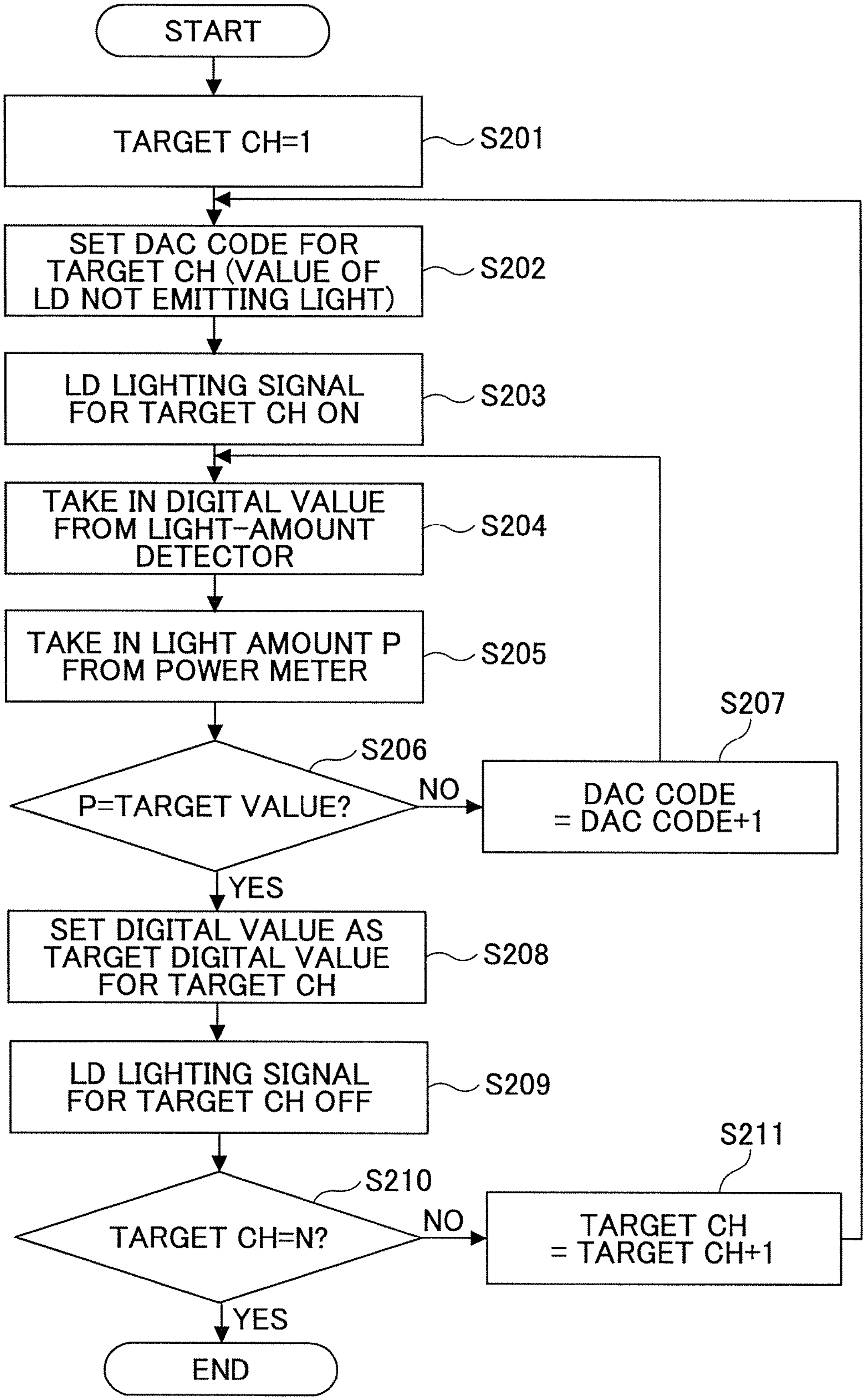
FIG. 9 is a flowchart illustrating a control procedure for determining a target digital value with the circuit configuration in FIG. 8.

FIG. 9 is a flowchart illustrating a control procedure for determining a target digital value with the circuit configuration in FIG. 8. With this control procedure, first the control target is set to Channel 1 (Step S201) to start the procedure from a "_1" circuit. Now, the CPU 1 sets a DAC code to a value corresponding to the LD_1 (6_1) not emitting light (Step S202) with the LD lighting signal of the target channel turned on (Step S203). Then, a digital value is taken in from PD_1 (7_1) based on a light-emitting amount of LD_1 (6_1) (Step S204), and an optical amount P is taken in from the power meter 13 (Step S205). Then, the procedures of Steps S202 through S206 are repeated, incrementing the DAC code until P becomes the target value (Steps 206, 207). When the light amount P becomes the target value, the digital value based on the DAC code at that time becomes the target digital value (Step 208). Then, the LD lighting signal of the target channel is turned off (Step S209), and procedures of Steps S202 through S211 are repeated until the target channel becomes N (Steps 210, 211) to determine the target digital value for Channels 1 to N. The procedure ends once the target digital values are determined for all the Channels. The flowchart for the above procedure, which is programmed, is executed at the CPU 1.

The multiple target digital values determined with the control procedure as shown in FIG. 9 are kept in the CPU 1, and thereafter, the multiple target digital values are used to keep the respective LD light amounts at a constant value.

Controlling in this way allows doing away with a hold capacitor as the setting values of the LD drive currents are set equal to the corresponding DAC_1-N (2_1-N).

This embodiment may be arranged such that, while the CPU 1 is operating with the procedure in FIG. 8 to determine a target digital value, the control procedure is embodied with an adjusting step and the determined target digital value is stored in a CPU 1-associated non-volatile storing device (not shown). When operating as a printing device, the target digital value stored in the non-volatile storing device is used to keep the LD light amount at a constant value. Here, the control procedure for determining a target digital value makes it unnecessary to execute it at a printing device.

Figure 10:
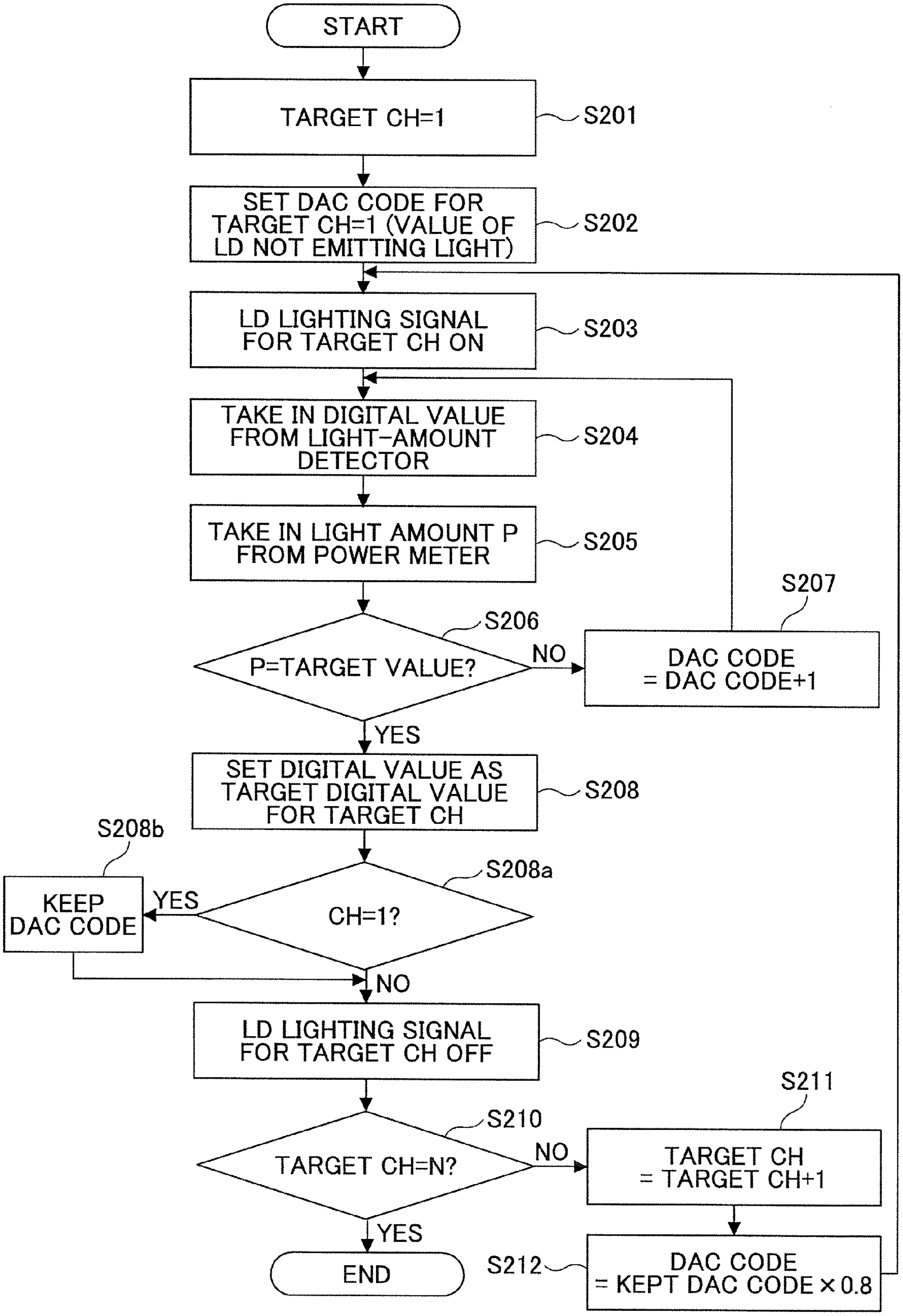
FIG. 10 is a flowchart illustrating another control procedure for determining the target digital values with the circuit configuration in FIG. 8.

FIG. 10 is a flowchart illustrating another control procedure for determining the target digital values with the circuit configuration in FIG. 8. With this control procedure, for determining the target digital values for the second and subsequent LD_2 . . . N (6_2 . . . N), as an initial value for the DAC code, a multiplier less than 1 (the multiplier=0.8 in FIG. 10) is multiplied by the DAC code at the time the first LD_1 (6_1) reaches the target value, with the process of Steps S203 and thereafter being executed from the Channel 1 to N based on the resulting value. This makes it possible to reduce the time required for the control process as LD_1 . . . N (6_1 . . . N) would not emit light more than necessary, and the process flow starts from a light amount close to the target light amount. Each of the other steps are processed in a manner similar to that of FIG. 9.

Again the control procedure as described above, which is programmed, is executed at the CPU 1.

The present application is based on the Japanese Priority Application No. 2007-054312 filed on Mar. 5, 2007, the entire contents of which are hereby incorporated by reference.

The invention claimed is:

1. A light-amount control apparatus for controlling an output light amount of a plurality of light sources used for optical writing, comprising:

a plurality of drive units, each of the drive units supplying a drive current to one of the plurality of light sources;

a plurality of drive-current setting units, each of the drive-current setting units determining an amount of the drive current supplied to one of the plurality of light sources;

a light-amount detecting unit for detecting an output light from each of the plurality of light sources individually, and outputting a voltage according to the detected light amount; and a processing unit for setting the drive current amount for each of the plurality of light sources based on the detected value detected with the light-amount detecting unit for each of the light sources.

2. The light-amount control apparatus as claimed in claim 1, further comprising an A/D conversion unit, wherein the A/D conversion unit A/D converts the detected value of the light amount for each of the plurality of light sources detected as the voltage with the light-amount detecting unit, and the processing unit sets the drive current amount for each of the plurality of light sources based on the voltage value A/D converted with the A/D conversion unit.

3. The light-amount control apparatus as claimed in claim 2, further comprising:

a light-amount measuring unit for measuring a physical amount of the light amount output from each of the plurality of light sources, wherein the processing unit progressively increments the drive current amount for each of the plurality of light sources from a value at which each light source does not emit light, and sets the drive current amount with the converted value at the A/D conversion unit at a time the physical amount measured with the light-amount measuring unit becomes a target value.

4. The light-amount control apparatus as claimed in claim 2, further comprising:

a light-amount measuring unit for measuring a physical amount of the light amount output from each of the plurality of light sources, wherein the processing unit progressively increments the drive current amount for each of the plurality of light sources from a value at which each light source does not emit light, and computes a subsequent target value from the converted value at the A/D conversion unit at a time the physical amount measured with the light-amount measuring unit approaches a physical amount near a target value and from the physical amount near the target value to set the drive current amount as the subsequent target value.

5. The light-amount control apparatus as claimed in claim 2, further comprising a light-amount measuring unit for measuring a physical amount of the light amount output from each of the plurality of light sources, wherein the processing unit repeats:

progressively incrementing the drive current amount for a first light source of the plurality of light sources from a value at which the first light source does not emit light, setting the drive current amount of the first light source with the converted value at the A/D conversion unit at a time the physical amount measured with the light-amount measuring unit becomes a target value as a subsequent target value, keeping the set drive current amount, and, for a second light source of the plurality of light sources and subsequent light sources of the plurality of light sources, progressively incrementing from a value multiplied by a predetermined multiplier to a value of the kept drive current amount kept at the drive current amount supplied to the first light source, and setting the drive current amount for the second light and subsequent light sources of the plurality of light sources.

6. The light-amount control apparatus as claimed in claim 2, further comprising a light-amount measuring unit for measuring a physical amount of light amount output, wherein the processing unit progressively increments the drive current amount for the plurality of light sources from a value at which each light source does not emit light, and sets the drive current amount of each light source sources with a value computed from the converted value at the A/D conversion unit at a time the physical amount measured with the light-amount measuring unit approaches a physical amount near the target value and from the physical amount near the target value as a subsequent target value.

7. The light-amount control apparatus as claimed in claim 6, wherein an equation for the processing unit to calculate the subsequent target value from an A/D converted value of the detected value of the light amount at a time the physical amount of the light amount becomes a value near the target value, and the physical amount of the light amount is:

a target A/D converted value of the detected value of the light amount=(the physical amount of the target light amount/the physical amount of the measured light amount)×(the A/D converted value of the detected value of the current light amount).

8. The light-amount control apparatus as claimed in claim 6, wherein the processing unit includes a storing unit for storing the target value.

9. The light-amount control apparatus as claimed in claim 8, wherein the light sources include a laser diode.

10. An optical writing apparatus, comprising:

the light-amount control apparatus as claimed in claim 1.

11. An image forming apparatus, comprising:

the light-amount control apparatus as claimed in claim 1.

* * * * *